(12) United States Patent  
Smith et al.

(10) Patent No.: US 11,331,809 B2  
(45) Date of Patent: May 17, 2022

(54) DYNAMICALLY CONTROLLED ROBOTIC STIFFENING ELEMENT

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 1077 days.

(21) Appl. No.: 15/846,038

(22) Filed: Dec. 18, 2017

(65) Prior Publication Data

US 2019/0184576 A1 Jun. 20, 2019

(51) Int. Cl.

| | |
|---|---|
| *B25J 13/02* | (2006.01) |
| *B25J 17/00* | (2006.01) |
| *B25J 19/00* | (2006.01) |
| *B25J 19/06* | (2006.01) |
| *B25J 13/08* | (2006.01) |

(52) U.S. Cl.
CPC ........... *B25J 13/025* (2013.01); *B25J 13/087* (2013.01); *B25J 13/088* (2013.01); *B25J 17/00* (2013.01); *B25J 19/0004* (2013.01); *B25J 19/068* (2013.01)

(58) Field of Classification Search
None
See application file for complete search history.

(56) References Cited

U.S. PATENT DOCUMENTS

| | | |
|---|---|---|
| 1,880,138 A | 9/1932 | Franz |
| 2,850,189 A | 9/1958 | Leroy |
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 3,858,468 A | 1/1975 | Pasbrig |
| 4,046,262 A | 9/1977 | Vykukal et al. |

(Continued)

FOREIGN PATENT DOCUMENTS

| | | |
|---|---|---|
| CN | 101214653 A | 7/2008 |
| CN | 103610524 A | 3/2014 |

(Continued)

OTHER PUBLICATIONS

International Search Report for International Application No. PCT/US2019/068998 dated May 20, 2020, 15 pages.

(Continued)

*Primary Examiner* — Vicky A Johnson

(57) ABSTRACT

A stiffening element to provide variable resistance to movement between a pair of members at a joint. The stiffening element comprises a filler with particles flowable in a bladder. A pressure source is coupled to the bladder to vary a pressure within the bladder and collapse the bladder. Collapsing the bladder varies a flow characteristic of the filler within the bladder, Varying the flow characteristics of the filler varies resistance of the bladder to movement of the bladder, and thus a pair of movable members and the joint.

47 Claims, 7 Drawing Sheets

(56) References Cited

U.S. PATENT DOCUMENTS

| | | |
|---|---|---|
| 4,179,233 A | 12/1979 | Bromell et al. |
| 4,200,596 A | 4/1980 | Iiyama et al. |
| 4,251,791 A | 2/1981 | Yanagisawa et al. |
| 4,398,110 A | 8/1983 | Flinchbaugh et al. |
| 4,483,407 A | 11/1984 | Iwamoto et al. |
| 4,561,686 A | 12/1985 | Atchley |
| 4,567,417 A | 1/1986 | Francois et al. |
| 4,575,297 A | 3/1986 | Richter |
| 4,591,944 A | 5/1986 | Gravel |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Shinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosier |
| 6,855,170 B2 | 2/2005 | Gramnas |
| 7,168,748 B2 | 1/2007 | Townsend et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,132,835 B2 | 3/2012 | Ban et al. |
| 8,151,401 B2 | 4/2012 | Cheyne |
| 8,182,010 B2 | 5/2012 | Lee et al. |
| 8,245,728 B2 | 8/2012 | Jacobsen et al. |
| 8,295,975 B2 | 10/2012 | Arimatsu et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,534,728 B1 | 9/2013 | Bosscher et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iverson et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 | 5/2016 | Herr et al. |
| 9,533,411 B2 | 1/2017 | Jacobsen et al. |
| 9,616,580 B2 | 4/2017 | Smith et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 9,895,812 B2 | 2/2018 | Gonzalez et al. |
| 10,028,844 B2 | 7/2018 | Cheng et al. |
| 10,071,485 B2 | 9/2018 | Schiele et al. |
| 10,216,177 B2 | 2/2019 | Gildert et al. |
| 10,406,676 B2 | 9/2019 | Smith et al. |
| 10,512,583 B2 | 12/2019 | Smith |
| 10,533,542 B2 | 1/2020 | Smith et al. |
| 10,566,914 B2 | 2/2020 | Fujita et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |

(56) References Cited

U.S. PATENT DOCUMENTS

| | | |
|---|---|---|
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1 | 1/2008 | Perry et al. |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0272749 A1 | 10/2015 | Amend, Jr. et al. |
| 2015/0278263 A1 | 10/2015 | Bowles et al. |
| 2015/0321340 A1 | 11/2015 | Smith |
| 2015/0321342 A1 | 11/2015 | Smith et al. |
| 2016/0003268 A1* | 1/2016 | Shevchenko ......... F15B 15/103 305/1 |
| 2016/0114482 A1 | 4/2016 | Lessing et al. |
| 2016/0153508 A1 | 6/2016 | Battlogg |
| 2016/0279788 A1 | 9/2016 | Kanaoka et al. |
| 2016/0331556 A1 | 11/2016 | Wijesundara et al. |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2017/0050310 A1 | 2/2017 | Kanaoka |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |
| 2018/0290309 A1 | 10/2018 | Becker et al. |
| 2018/0298976 A1 | 10/2018 | Battlogg |
| 2019/0105777 A1 | 4/2019 | Dalley et al. |
| 2019/0176320 A1 | 6/2019 | Smith et al. |
| 2020/0001450 A1 | 1/2020 | Smith et al. |

FOREIGN PATENT DOCUMENTS

| | | |
|---|---|---|
| CN | 203495949 U | 3/2014 |
| CN | 203752160 U | 8/2014 |
| CN | 104843484 A | 8/2015 |
| CN | 105411813 A | 3/2016 |
| CN | 105818143 A | 8/2016 |
| CN | 107471203 A | 12/2017 |
| CN | 108081303 A | 5/2018 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |

(56) References Cited

FOREIGN PATENT DOCUMENTS

| | | |
|---|---|---|
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2004-105261 A | 4/2004 |
| JP | 2005-118938 A | 5/2005 |
| JP | 2005-237504 A | 9/2005 |
| JP | 2005-334999 A | 12/2005 |
| JP | 2006-016916 A | 1/2006 |
| JP | 2006007337 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014200853 A | 10/2014 |
| JP | 2014200853 A * | 10/2014 |
| JP | 2015112649 A | 6/2015 |
| JP | 2015-212010 A | 11/2015 |
| JP | 2015-214019 A | 12/2015 |
| JP | 2016-539017 A | 12/2016 |
| KR | 2005-0037754 A | 4/2005 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO 2019/060791 A1 | 3/2019 |

OTHER PUBLICATIONS

International Search Report for International Application No. PCT/US2019/069004 dated Apr. 1, 2020, 15 pages.
Aghili et al., Sensing the torque in a robot's joints, www.memagazine.org/backissues/september98/features/torque/torque.html, 1998, pp. 1-9, The American Society of Mechanical Engineers.
Amikabir University of Technology, Manipulator Dynamics (Power Point), Computer Engineering and Information Technology Department, to the best of applicant's knowledge article was available before the application filing date, 44 pages.
Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.
Bauman, Utah Firm Markets on Big Gorilla of an Arm, Deseret News; Jan. 27, 1993, 2 pages, Deseret News Publishing Company, Salt Lake City, Utah.
Claeyssen et al., Magnetostrictive actuators compared to piezoelectric actuators, Proceedings of SPIE—The International Society for Optical Engineering 4763, Mar. 2003, 6 pages.
Digital World Tokyo, Giant Robot Grabbing Hands Grab All They Can, www.digitalwordtokyo.com/index.php/digital_tokyo/articles/giant_robot_grabbing_hands_grab_all_they_can/, Jul. 17, 2007, 3 pages.
Elliott et al., The Biomechanics and Energetics of Human Running using an Elastic Knee Exoskeleton, Jun. 2013, 7 pages, IEEE International Conference on Rehabilitation Robotics, Seattle, Washington.
Elliott et al., Design of a Clutch-Spring Knee Exoskeleton for Running, Journal of Medical Devices, Sep. 2014, 11 pages, vol. 8, The American Society of Mechanical Engineers, New York City, New York.
Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.
Gauthier et al., Magnetic Shape Memory Alloy and Actuator Design, Conference: 5th International Workshop on Microfactories (IWMF'06), Oct. 2006, 5 pages, Besançon, France.
Grabowski et al., Exoskeletons for Running and Hopping Augmentation, Journal of Applied Physiology, http://biomech_media_mit.edu/portfolio_page/load-bearing-exoskeleton-for-augmentation-of-human-running/, 2009, 4 pages, vol. 107, No. 3, American Physiological Society, United States.
Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.
Huber et al., The selection of mechanical actuators based on performance indices, Oct. 8, 1997, pp. 2185-2205, vol. 453 Issue 1965, The Royal Society, London.
Hunter et al., Fast Reversible NiTi Fibers for Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.
Industrial Magnetics, Inc., PowerLift® Magnets; www.magnetics.com/product.asp?ProductID=1; as accessed Nov. 6, 2012, 2 pages; Boyne City, Michigan.
Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.
Jacobsen et al., Research Robots for Applications in Artificial Intelligence, Teleoperation and Entertainment; The International

(56) References Cited

OTHER PUBLICATIONS

Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kazerooni, Berkeley Lower Extremity Exoskeleton (BLEEX), to the best of applicant's knowledge article was available before the application filed, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, ¼-20 Thread, http://search.newport.com/?q=*&x2=sku&q2=200, as accessed Apr. 23, 2011, 1 page, Irvine, CA.

Oak Ridge National Laboratory, Foot Force—Torque Sensor Novel Sensor for Measuring Forces and Torques at the Foot, www.ornl.gov, to the best of applicant's knowledge article was available before the application filed, 1 page, Oak Ridge National Laboratory, Oak Ridge, Tennessee.

Omega, Load Cell Designs, www.omega.com/liturature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, in Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.eu/blog/scientists-develop-mechanical-spring-loaded-leg-brace to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3, PLOS One, San Francisco, California.

Siddharth et al., Design and Analysis of a 1-DOF Walking Mechanism, http://siddharthswaminathan.in/files/WalkingMechanism.pdf, Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton., 3 pages, to the best of the applicant's knowledge article was available before the application filed, US Bionics, Inc., Berkeley, California.

Suleiman, Engineering an affordable exoskeleton, Phys.org, https://phys.org/news/2014-06-exoskeleton.html, Jun. 12, 2014, 5 pages, Science X Network.

TMSUK, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

(56) References Cited

OTHER PUBLICATIONS

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the 10$^{th}$ International Workshop on Robot Motion and Control, Jul. 6-8, 2015, 6 pages, IEEE, Poland.

International Search Report for International Application No. PCT/US2019/069001 dated Apr. 30, 2020, 18 pages.

\* cited by examiner

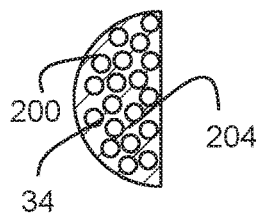
Fig. 9
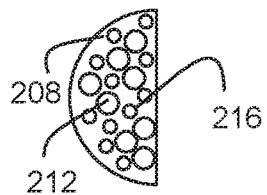
Fig. 10
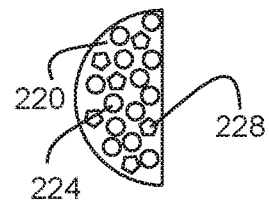
Fig. 11
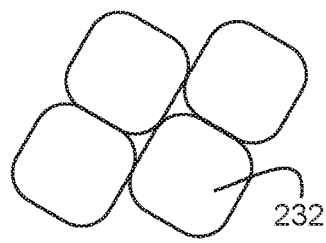
Fig. 12
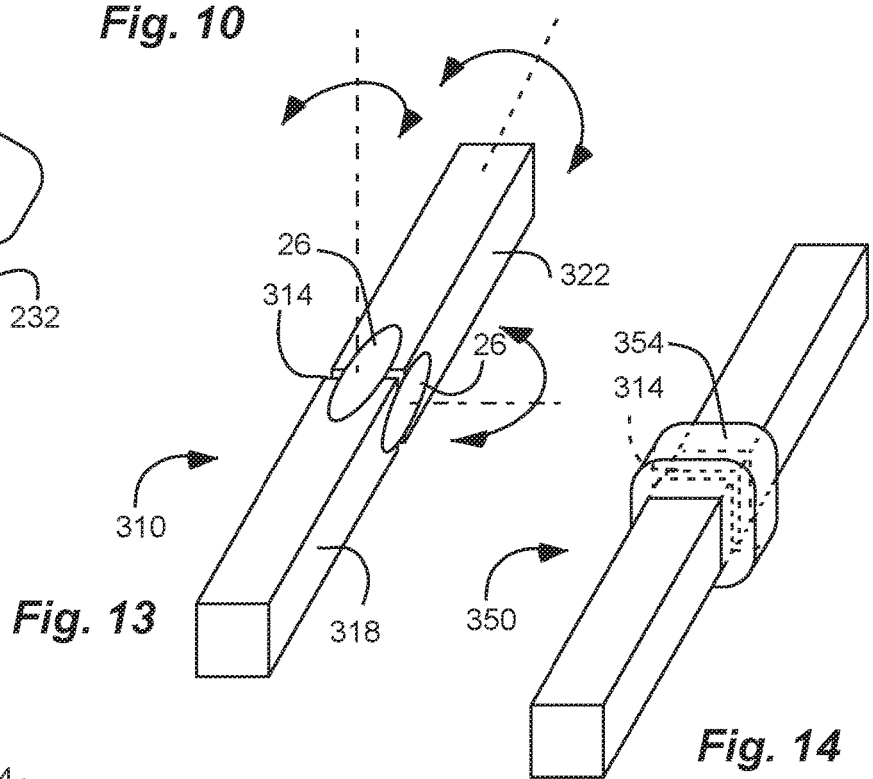
Fig. 13
Fig. 14
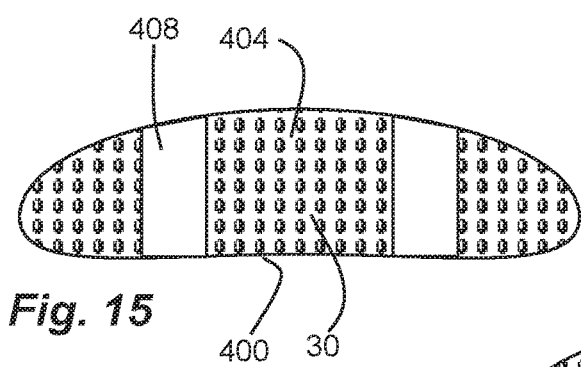
Fig. 15
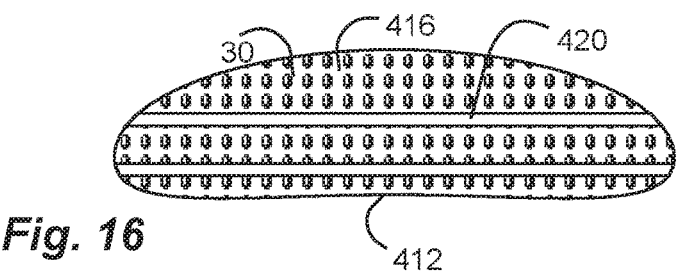
Fig. 16

DYNAMICALLY CONTROLLED ROBOTIC STIFFENING ELEMENT

BACKGROUND

Utilizing a master control system in remote or de-operation applications poses various challenges. For instance, when a human operator remotely controls a slave system (e.g., as part of or comprising a non-humanoid robot, humanoid robot, hand robot, virtual avatar/robot, tele-operated robot, etc.) with a master control system (e.g., as part of or comprising an exoskeleton, virtual reality controls, manipulator, etc.), the slave system can experience various forces due to pushing a mass or bumping into an object, for instance. Under these circumstances, it is often desirable for the human operator to be able to perceive or "feel" these for various purposes, such as to increase the sense of telepresence, to be able to improve control of or more accurately control the slave system for a particular task. Thus, robotic systems can be configured to utilize what has been termed "force-reflection," which is a type of force feedback where forces experienced by the slave are essentially "felt" by the user through the master control device.

Prior solutions used to achieve force reflection involve incorporating pneumatic or hydraulic actuators into a master control device of a robotic system that are controlled to provide a force reflection value to the human operator via joints of the master control device, which in some cases, for instance, can comprise an upper robotic exoskeleton worn by the operator. However, such solutions have various drawbacks, such as cost, complexity, weight, poor controllability, etc.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 9 is a detailed schematic side view of a filler of a stiffening element in one example, showing an interstitial material, namely a liquid, in interstices between the particles.

FIG. 10 is a detailed schematic side view of a filler of a stiffening element in one example, showing particles having different sizes.

FIG. 11 is a detailed schematic side view of a filler of a stiffening element in one example, showing particles having different shapes.

FIG. 12 is a detailed schematic side view of particles of a filler of a stiffening element in one example, showing a compressibility of the particles.

FIG. 13 is a schematic perspective view of another stiffening element in accordance with an example, shown with multiple bladders and multiple degrees of freedom.

FIG. 14 is a schematic perspective view of another stiffening element in accordance with an example, shown with multiple degrees of freedom, and a bladder surrounding the joint.

FIG. 15 is a schematic cross-sectional end view of a bladder of a stiffening element in accordance with an example, showing a bladder with multiple chambers.

FIG. 16 is a schematic cross-sectional side view of a bladder of a stiffening element in accordance with an example, showing a bladder with multiple chambers.

Figure 1:
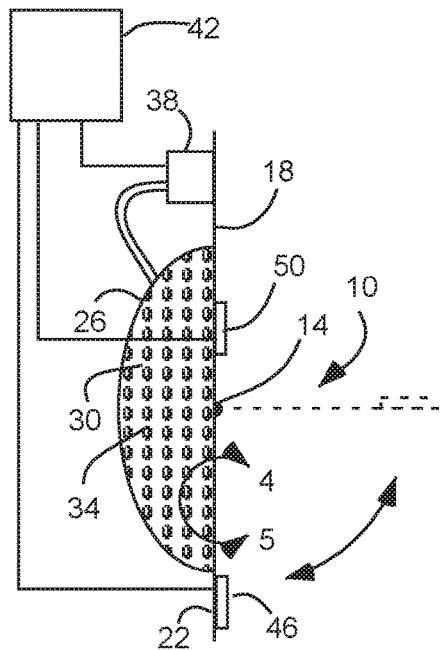
FIG. 1 is a schematic side view of a stiffening element in accordance with an example, shown in a first position and a relaxed configuration.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed herein is a stiffening element device operable to provide variable resistance to movement between a pair of members at a joint. The stiffening element comprises a filler flowable in a bladder, the filler comprising particles, wherein a flow characteristic of the filler varies, and interaction forces between the particles in the filler increase or vary, with pressure within the bladder, and resistance to movement of the pair of movable members varies with the flow characteristics of the filler. A pressure source can be coupled to the bladder to vary the pressure within the bladder, such as to collapse the bladder to some degree. Varying the flow characteristics of the filler, and varying interaction forces between the particles in the filler, varies resistance of the bladder to movement of the bladder, and thus a pair of movable members and the joint. In one aspect, the stiffening element can be part of a force reflective interface apparatus. In another aspect, the stiffening element can be part of a jamming or brake joint assembly for translating a force to a master robotic system. In another aspect, the stiffening element can be part of a force reflective interface apparatus for translating a force at a slave robotic system to a master system, and for generating a braking force within the joint corresponding to the force at the slave robotic system. In still another aspect, the stiffening element can be part of a force reflective interface apparatus for translating a force associated with a virtual environment to the apparatus, and for generating a braking force within the joint corresponding to the force associated with the virtual environment.

Figure 2:
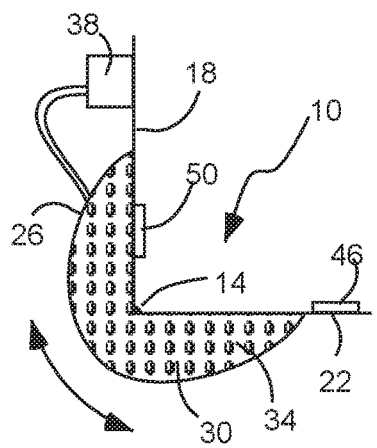
FIG. 2 is a schematic side view of the stiffening element of FIG. 1, shown in a second position and a relaxed configuration.
Figure 3:
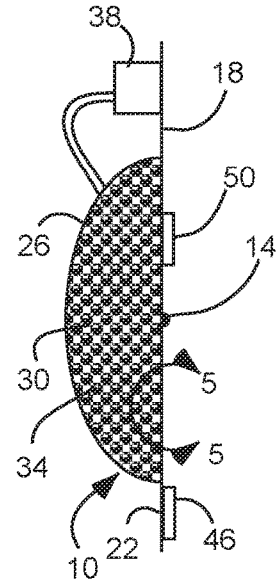
FIG. 3 is a schematic side view of the stiffening element of FIG. 1, shown in the first position and in a stiff configuration.

FIGS. 1 and 2 depict schematic side views of a stiffening element 10 in accordance with an example shown in a relaxed configuration and movable between a first position (FIG. 1) and a different second position (FIG. 2). FIG. 3 depicts a schematic side view of the stiffening element 10 in the first position, but in a stiff configuration. The stiffening element 10 comprises a joint 14 with a pair of movable and articulated members 18 and 22 that are movable with respect to one another about the joint 14. In one aspect, the joint 14 can be or can comprise a hinge of hinge-like joint, with a single degree of freedom, and pivotal about an axis (into the page of FIG. 1 at joint 14). In another aspect, the members 18 and 22 can pivot continuously about the joint 14 through a range of motion.

In addition, the stiffening element 10 can also comprise a bladder 26 coupled to the pair of movable members 18 and 22. The bladder 26 can be disposed at or about the joint 14, and can span across the joint 14. The bladder 26 can be flexible and resilient, or elastic, and can be formed of a flexible and resilient, or elastic, material. Thus, the bladder can have a volume that is changeable. For instance, the bladder can be configured to collapse a given degree under a corresponding given pressure, and can have a volume that is changeable. In addition, the bladder 26 can be configured to change shape and position as one member 22 moves with respect to the other 18. In one aspect, the bladder 26 can be formed of a single material, a laminate, or a reinforced material. The bladder 26 can be sealed with respect to the surrounding environment, and can be hermetically sealed. The bladder 26 can have an interior or hollow, and can define a pocket. In one aspect, the bladder 26 can be formed of a pair of layers sealed around a perimeter. An inner layer can be substantially and/or relatively flat, while an exterior layer can be substantially and/or relatively convex to create the hollow. The inner layer of the bladder can be coupled or otherwise secured to the members. An inner surface of the inner layer can be coupled or otherwise secured to the members such that a majority, or substantially all of the inner surface is coupled or secured to the members. In another aspect, a perimeter of the inner layer can extend beyond the seal to form a flange or tabs that can be coupled or otherwise secured to the members. In another aspect, opposite ends of the bladder can be coupled or otherwise secured to the members.

A filler 30 can be disposed in the bladder 16, and can be flowable or otherwise movable in the bladder 26. By flowable, it is meant that the particles can move relative to one another. In one example, the filler can comprise particles 34 that can flow and move with respect to one another, and that can bear against one another. In one aspect, the particles can substantially fill the bladder 26 in a loose manner, and can occupy a majority of the hollow of the bladder or volume thereof. The filler 30 flows, and the particles 34 move with respect to one another, within the bladder 26 as the bladder and the hollow or interior volume changes shape and position due to movement of the members 18 and 22. In one aspect, the filler 30 can further comprise a gas, such as air, filling interstices between the particles. Essentially, the filler can be contained within and caused to be flowable in the bladder, the filler comprising particles, wherein a flow characteristic of the filler varies with pressure within the bladder, and resistance to movement of the pair of movable members varies with the flow characteristics of the filler. In addition, the resistance to movement of the pair of movable members can be characterized as being the increase in interaction forces between the particles of the filler.

Furthermore, a pressure source 38 can be operatively coupled to the bladder 26 (e.g., operable to induce a pressure within or about the bladder 26), and capable of varying a pressure within the bladder. In one aspect, the pressure source 38 can comprise a vacuum source configured to selectively withdraw an interstitial material or fluid, such as gas or air, from the bladder 26. For example, the vacuum source can be a vacuum pump, such as a piston moveable within a cylinder. As the pressure changes within the bladder 26, the bladder collapses and the flow characteristics of the filler material 30 and the particles 34 vary. By collapse it is meant that the bladder collapses or reduces in volume at least some degree from its fully expanded state or condition. As the bladder changes volume, the contact and/or interference between the particles 34 of the filler is increased. As the flow characteristics of the filler and particles vary, a resistance of the bladder 26, with the filler 30 therein, to movement of the pair of movable members 18 and 22, and thus the joint 14, varies. Thus, the pressure source 38 or vacuum source can be selectively varied to selectively vary the resistance of the stiffening element 10. In one aspect, the resistance of the stiffening element 10 can be selectively varied through a continuous range of resistance between a zero resistance that permits free movement within the joint, and a resistance operable to lock the stiffening element 10 and the joint 14. The resistance can be adjusted dynamically to be essentially zero all the way to completely locked, or rigid, and any state in between. The pressure source 38 is capable of providing a variable degree/range of pressure within the bladder 26 to provide a variable degree/range of resistance of the bladder 26 with the filler 30 to the joint 14. The pressure source 38 is capable of varying pressure within the bladder 26 to provide a zero degree of resistance facilitating free movement within the joint 14, and a locked degree of resistance of the bladder 26 with the filler 30 within the joint 14. In another aspect, and although not shown, one skilled in the art will recognize that rather than varying the pressure source 38, the pressure source 38 can be operable with one or more valves in fluid communication with the pressure source 38 and the bladder 26, where the valves are controllable to vary the pressure within the bladder 26.

Figure 4:
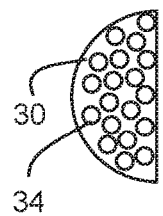
FIG. 4 is a detailed schematic side view of the stiffening element taken along line 4 of FIG. 1, showing particles of a filler in the relaxed configuration.
Figure 5:
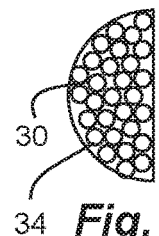
FIG. 5 is a detailed schematic side view of the stiffening element taken along line 5 of FIG. 3, showing particles of the filler in the stiff configuration.

FIG. 4 depicts a detailed schematic side view of the stiffening element 10 taken along line 4 of FIG. 1, while FIG. 5 is a detailed schematic side view of the stiffening element taken along line 5 of FIG. 3. FIG. 4 depicts the particles 34 of the filler 30 in the relaxed configuration of the stiffening element 10 or joint 14 corresponding to a relatively larger pressure, such as ambient pressure, within the bladder 26. The particles 34 can flow and move relative to one another, and while in contact one another, are not brought to bear against one another with any significant frictional force. Thus, the members 18 and 22 can be relatively free to move with respect to one another, and experience very little or nominal resistance from the stiffening element 10 or bladder 26. On the other hand, FIG. 5 depicts the particles 34 of the filler 30 in the stiff configuration of the stiffening element 10 or joint 14 corresponding to a relatively lower pressure, with respect to the larger pressure or ambient pressure. In this case, the bladder 26 has been caused to collapse on the filler 30, and thus the particles 34, and the particles are brought to bear against one another, and interfere with one another to restrict flow. Thus, the members 18 and 22 can have relatively restricted movement, and can experience relatively larger resistance from the stiffening element 10 or bladder 26. The particles 34 can be relatively loose under greater pressure, as shown in FIG. 4, and can flow easily with respect to one another; but the particles 34 can be relatively compacted under less pressure, as shown in FIG. 5, and can have difficulty flowing with respect to one another. Compacting the particles 34 can result in greater physical impediment to flow, and greater friction between the particles. As the pressure source 38 or vacuum reduces pressure within the bladder 26, the bladder 26 collapses and compacts the particles 34 of the filler 30, thus impeding the flow of the particles 34 and stiffening the joint. Essentially, with reduced pressure, the particles 34 are forced together, thus increasing the kinetic coefficient of friction between them. The magnitude of the kinetic coefficient of friction can be varied by varying the pressure induced by the collapse of the bladder 26 and the resulting compaction of the particles 34.

Referring again to FIGS. 1-3, the stiffening element 10 can further comprise one or more sensors and a controller 42. The sensors can sense a characteristic of the stiffening element 10, such as pressure in the bladder, or a position of one or more of the members 18 and 22. In one aspect, a position sensor 46 can be operatively coupled to at least one of the pair of members, such as member 22, and can be capable of providing feedback to the pressure source 38 and/or the controller 42. Thus, the resistance can be varied based on a position of the members 18 and/or 22 as sensed by the sensor 46. As another example, a pressure sensor 50 can be operatively coupled to the bladder 26, such as the bladder itself, the pressure source, or a pressure line between the bladder and the pressure source. The pressure sensor 50 can be capable of providing feedback to the pressure source 38 and/or the controller 42. Thus, the resistance can be varied based on a pressure of the bladder. The controller 42 can be operatively coupled to the pressure source 38 (or alternatively one or more valves) to control the pressure source to selectively vary the pressure within the bladder 26. In another aspect, a force sensor can be used. In another aspect, pressure force and position sensors can be used.

Figure 6:
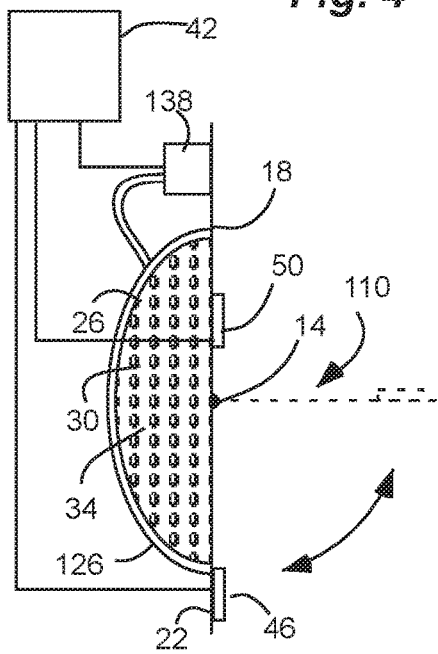
FIG. 6 is a schematic side view of another stiffening element in accordance with an example, shown in a first position and a relaxed configuration.
Figure 7:
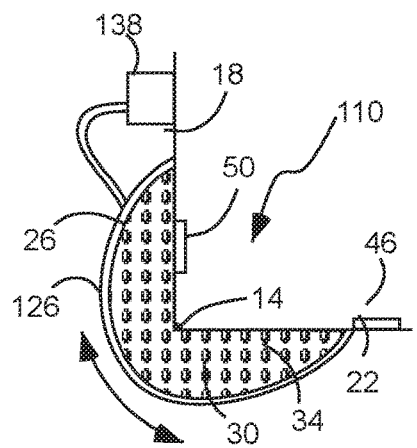
FIG. 7 is a schematic side view of the stiffening element of FIG. 6, shown in a second position and a relaxed configuration.
Figure 8:
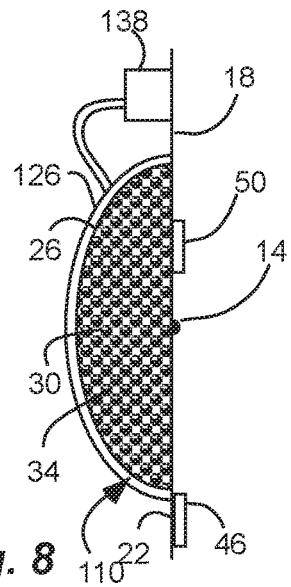
FIG. 8 is a schematic side view of the stiffening element of FIG. 6, shown in the first position and in a stiff configuration.

FIGS. 6 and 7 depict schematic side views of a stiffening element 110 in accordance with another example shown in a relaxed configuration and movable between a first position (FIG. 6) and a different second position (FIG. 7). FIG. 8 depicts a schematic side view of the stiffening element 110 in the first position, but in a stiff configuration. The stiffening element 110 of FIGS. 6-8 is similar in most respects to that described above, and which description is hereby incorporated herein where applicable, as will be recognized by those skilled in the art. The stiffening element 110 has a bladder 26, as described above, and defines an inner bladder. In addition the stiffening element 110 has an outer bladder 126 disposed over the inner bladder 26. Thus, the inner bladder 26 can be disposed between the members 18 and 22 and the outer bladder 126. In one aspect, the outer bladder 126 can be stiffer, or less flexible, than the inner bladder 26. The stiffening element 110 further comprises a positive pressure source 138 for selectively increasing the pressure within the outer bladder 126, thus changing the pressure of the inner bladder relative to the outer bladder, and collapsing the inner bladder 26. The inner bladder can be vented.

FIG. 9 depicts a detailed schematic side view of filler 200 of a stiffening element showing an interstitial material 204 in interstices between the particles 34. In one aspect, the interstitial material 204 can comprise a liquid, such as oil to facilitate flow of the particles. In one aspect, the interstitial material can be non-compressible. In one aspect, the interstitial material 204 can fill the interstices between the particles 34, and can substantially fill the bladder. In another aspect, the interstitial material 204 can substantially coat the particles 34, defining coated particles, while of majority of the interstices between the particles 34 remains a gas. Thus, the interstitial material can comprise a fluid, such as a liquid or a gas.

FIG. 10 depicts a detailed schematic side view of a filler 208 of a stiffening element showing particles 212 and 216 having different sizes. The particles 212 and 216 of the filler can comprises at least two different sizes of particles, and in some examples three, four or more different sizes. In one aspect, smaller particles 216 can be disposed in the interstices between the larger particles 212. In one aspect, the particles can be formed of different materials, and can have different characteristics, such as different coefficients of friction, different compressibility, etc. Those skilled in the art will recognize that the size, configuration, material makeup or type, etc. and relative quantities of the particles 212 and 216 can be selected to obtain desired flow characteristics, and to tune the resistance characteristics of the stiffening element. Indeed, it is contemplated that the stiffening elements discussed herein can be tuned as needed or desired.

FIG. 11 depicts a detailed schematic side view of a filler 220 of a stiffening element showing particles 224 and 228 having different shapes. The particles of the filler can comprise at least two different shapes of particles, and in some examples three, four or more different shapes or configurations. In one aspect, some of the particles 224 can be spherical while other particles 228 can have flat surfaces. In another example, the shapes or configuration of the particles 224 can be random. The particles can have different characteristics due to their respective shapes that can change the flow characteristics. The shapes of the particles 224 and 228 can be selected to obtain desired flow characteristics, and to tune the resistance characteristics of the stiffening element.

FIG. 12 depicts a detailed schematic side view of particles of a filler of a stiffening element showing a compressibility of the particles 232. In one aspect, the particles 232 of the filler can be elastically compressible, as shown. In another aspect, the particles can be relatively rigid. The particles of the filler can have an elastic modulus, which is a measure of elastic deformation in response to an applied load, and/or a yield strength, which is the onset of plastic deformation at a given stress level. In one aspect, the particles can comprise rubber, which essentially does not have a yield strength, but rather elastically deforms until it fractures. In one aspect, the particles of the filler can have a relatively low modulus (Young's Modulus of Elasitcity), such as 0.01-3.5 GPa, and can comprise a polymer, such as rubber (Young's Modulus of 0.01-0.1 GPa or $1.45\text{-}14.5\times10^{-3}$ Mpsi), Acrylonitrile Butadiene Styrene (ABS) (Young's Modulus of 1.4-1.3 GPa or 2.3 GPa), nylon (Young's Modulus of 2-4 GPa or 0.29-0.58 Mpsi; yield strength of 45 MPa), low-density polyethylene (Young's Modulus of 0.11-0.86 GPa or $1.6\text{-}6.5\times10^{-3}$ Mpsi), high-density polyethylene (Young's Modulus of 0.8 GPa or 0.116 Mpsi), polypropylene (Young's Modulus of 1.5-2 GPa or 0.22-0.29 Mpsi), polyimide (Young's Modulus of 2.5 GPa), polystyrene (Young's Modulus of 3-3.5 GPa or 0.44-0.51 Mpsi), etc. In another aspect, the particles of the filler can have a relatively high modulus, such as 50-100 GPa, and can comprise sand (7-80 MPa), aluminum (Young's Modulus of 69 GPa or 10 Mpsi; yield strength of 95 MPa), glass (Young's Modulus of 50-90 GPa or 7.25-13.1 Mpsi), etc. In one aspect, the particle of the filler can be light-weight materials to facilitate mobility. In another aspect, the moduli of the material can be selected based on material properties temperature ranges of interest. In another aspect, the particles of the filler can have at least two different moduli.

FIG. 13 depicts a schematic perspective view of another example stiffening element 310 with multiple degrees of freedom. Thus, the joint 314 can pivot in multiple directions, and the members 318 and 322 can articulate about multiple axes. In addition, the stiffening element 310 can have multiple bladders 26. Each bladder can be coupled to the pair of members 318 and 322, and each comprises a filler. In addition, the bladders 26 can be oriented and positioned in parallel with respect to one another. In one aspect, the joint 314 can pivot about two axes, and a bladder can be configured for each axis or degree of freedom. In one aspect, different bladders can have different fillers with different resistance characteristics. Thus, the multiple different bladders can be coupled to a single pressure source, but provide different resistance based on the same pressure. In another aspect, the multiple different bladders can be coupled to multiple pressure sources providing different pressures to obtain different resistance characteristics.

FIG. 14 depicts a schematic perspective view of another example stiffening element 350 with multiple degrees of freedom, as described above. In addition, the stiffening element 350 has a bladder 354 surrounding or circumscribing the joint 314. Thus, a single bladder 354 can accommodate multiple degrees of freedom of axes. In one aspect, the bladder 354 can have a torus shape circumscribing the entire joint. However, this is not intended to be limiting in any way. FIG. 14 is intended to illustrate that a bladder 354 can extend about an entire joint, and can be used to provide stiffening of the joint in the various multiple degrees of freedom provided by the joint.

FIG. 15 depicts a schematic cross-sectional end view of an example bladder 400 of a stiffening element with the bladder having multiple chambers therein (e.g., chambers 404 and 408) defining collapsible pockets. In one aspect, some of the chambers 404 contain the filler 30, and some of the chambers 408 are void of the filler. In another aspect, the chambers can be arrayed in a series alternating between chambers with and without filler. The chambers 408 without filler can define voids. The voids can allow the chambers 404 with filler 30 to collapse into the voids. In another aspect, the different chambers can contain different fillers. Thus, the bladder can be tailored to collapse and/or the filler can be tailored to flow in a particular manner. In one aspect, the chambers 404 and 408 can be arrayed laterally, or disposed laterally with respect to one another, as shown in FIG. 15. In one aspect, the chambers 404 can be coupled to a common pressure source. In another aspect, the chambers 404 can be coupled to different pressure sources. Having separate pressure sources per chamber can provide a single bladder with multiple different responses. Thus, the resistance response can be tailored. In another aspect, the chambers 408 or voids can be coupled to the pressure source.

FIG. 16 depicts a schematic cross-sectional side view of a bladder 412 of a stiffening element with the bladder having multiple chambers 416 and 420. In one aspect, the chambers 416 and 420 can be arrayed in different distances from the joint, with one atop another, to create layered chambers. The bladder 412 can be similar to bladder 400 described above, and the chambers 416 and 420 can be similar to those chambers 404 and 408 described above.

In one aspect, the joint and the pair of members described above and herein can comprise and can be part of a wearable article, system, etc. capable of being donned and doffed (i.e., worn) by a user. In one aspect, the wearable article can comprise a rigid exoskeleton, and the members can be rigid. In another aspect, the wearable article can be flexible, and the members and joints can be flexible. Such wearable articles can be utilized in translating force reflection to master robotic control systems and the operators of such systems. In addition, such wearable articles can be utilized to provide haptic feedback as part of a virtual environment of a virtual reality system.

Figure 17:
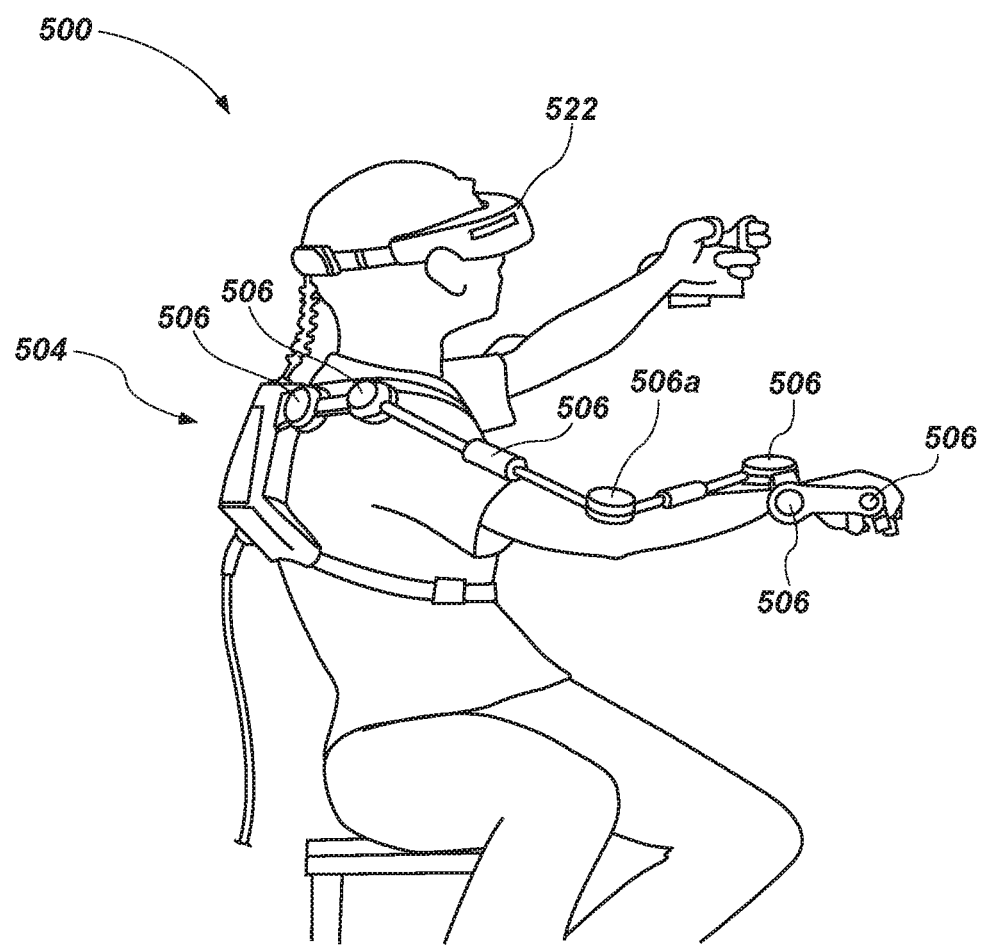
FIG. 17 is a schematic view of a master robotic system having at east one master brake joint with a stiffening element and associated with a corresponding joint of a slave robotic system, in accordance with an example.
Figure 17:
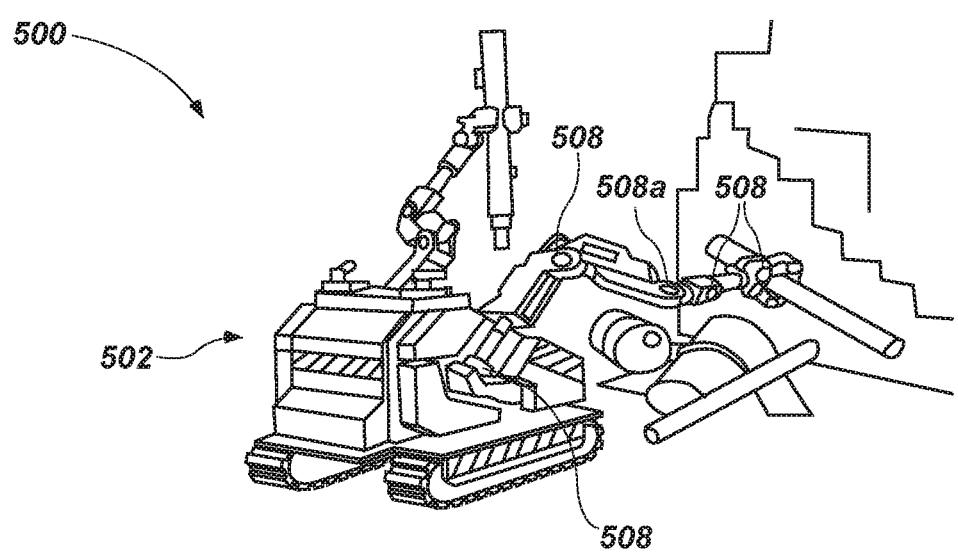

FIG. 17 depicts a schematic view of a master robotic system associated with a corresponding robotic system in accordance with an example, and as described in greater detail in U.S. patent application Ser. No. 15/835,280, filed Dec. 7, 2017, which is hereby incorporated herein by reference. The master robotic system can have at least one master brake joint associated with a corresponding joint of the robotic system. The master robotic system and/or the master brake joint thereof can comprise a stiffening element, as described herein.

The brake joint assembly and/or the stiffening element can translate a force to the master robotic system. The brake joint can comprise a stiffening element, or bladder with filler therein, as described above, and operable to selectively generate a braking and/or resistive force within the brake joint as corresponding to a force experienced by a slave robotic system associated with (or operable by) the master robotic system. In one aspect, the braking force can be dynamically controlled by the master robotic system as corresponding to a dynamic resistance force experienced by the slave robotic system, such that a magnitude of the braking force can be varied as needed or desired.

In addition, a system is provided for providing force feedback from a slave robotic system to a master robotic system. The system can comprise a slave robotic system comprising a plurality of slave joints and a master robotic system having a one or a plurality of master brake joints each corresponding to respective slave joints controlled by the master robotic system. In one aspect, each master brake joint can comprise a stiffening element, or bladder with filler therein, as described above, and operable to generate a variable braking or resistive force to the master brake joint corresponding to a variable force reflection of the respective slave joint of the slave robotic system. The master robotic system can comprise a humanoid robotic assembly, an exoskeleton robotic assembly, a human-operated robotic assembly, a manipulator, etc.

FIG. 17 depicts a system 500 for providing force reflection between a slave robotic system 502 and a master robotic system 504. Generally, the master robotic system 504 can comprise at least one master brake joint 506 associated with a corresponding slave joint 508 of the slave robotic system 502 for reflecting forces experienced about the slave joint 508 to the master brake joint 506. For instance, master brake joint 506a has a degree of freedom (DOF) that corresponds to a human elbow, which corresponds to the controlled slave joint 508a (a slave elbow joint), wherein forces experienced within the slave joint 508a can be reflected in the master brake joint 506a in a desired proportion. Each master brake joint 506 can be or can comprise a stiffening element, with a bladder and filler therein, as described above. In this example, a human operator can don the master robotic system 504 as an exoskeleton robotic assembly (e.g., upper and/or lower exoskeleton). It is noted that the master control robotic system can comprise robotic systems worn by humans or that function as stand-alone robots or robotic systems. For example, the master control robotic system can comprise an exoskeleton robotic assembly, a non-humanoid robot, a humanoid robot, a virtual reality controlled system, and others as will be apparent to those skilled in the art. It is further noted that the slave robotic system can comprise any type of teleoperated robot, unmanned ground robot, aerial robot, humanoid robot, hand robot, virtual avatar robot, and others as will be apparent to those skilled in the art.

The brake-based joints are provided in an input device as part of a master robotic system operable to control a slave robotic system. Any particular master brake-based joint assembly can have position and load sensors associated with one or more degrees of freedom (DOF(s)) of the brake-based joint and that are used in controlling a corresponding DOF of a slave joint of a slave robotic system.

Regarding force-reflection, when the slave joint 508a experiences a force or breaches or attempts to breach a restricted zone of travel (e.g., the right slave arm contacts a wall or lifts a mass or extends beyond a given point, etc.), a force is sensed by load and/or position sensors associated with the slave joint 508a. The slave robotic system 502 transmits force reflection data (associated with the resistance force) to the master robotic system 504 (or other control system). The master robotic system 504 then causes (i.e., via a controller) the brake joint 506a to generate a braking force (apply or release) as force reflection that corresponds to the force experienced by the slave robotic system 502 via the slave joint 508a. This force reflection or force feedback may be configured to be proportional or not. Thus, the master robotic system 502 can, at least to some degree, "feel" what the slave robot "feels", and such force reflection can be transferred as a resistance force to the operator (in the exoskeleton example) or to a humanoid robot, for instance.

Generally, as with the exoskeleton type of master control device example, with force reflection the operator is provided with sensory input for operating a (e.g., right) slave arm, for instance, with a (e.g., right) master control arm (FIG. 17). Unlike positional control, where the slave arm will operate to carry out the positional command from the master arm regardless of obstacles that may be in the path of the slave arm, force reflection provides a proportional force feedback to the operator via the master control arm to indicate loads that the slave arm is experiencing. For example, if the slave arm encounters an obstacle while executing a positional command from the master arm, a load sensor on the slave arm can provide load information that is communicated or fed back to the master control arm, and brake joint(s) operable within the master control arm can apply a proportional load to the operator based on the load information received. Such proportional load may be varied or different depending upon the particular operating environment and what may be desired to be applied to the operator. With such force feedback, the operator can more intuitively control the slave arm in the operating environment because it more closely resembles the operator's experience operating the operator's own body in everyday life. For example, if an object weighs 500 pounds, the proportional force reflected load (i.e., via a braking force) experienced by the operator could be caused to be 10 pounds.

In certain aspects, force reflection implementation can include an increased load produced by the master control arm on the operator when the slave arm experiences an impact event. In other words, an impact sensed by the load sensors can be reflected to the user via the master control arm as a transient spike in load disproportionate to the normal proportional setting for force reflection. For example, when the slave arm collides with a wall, the load sensors of the slave arm sense the impact. To alert the operator that an impact has occurred, the master control arm can produce a load on the user that is disproportionately large relative to the current proportional force reflective setting for a brief period of time that can effectively represent the impact to the operator. For example, the force on the operator produced on an impact could be so disproportionately large that the operator would not be able to further move the master arm, effectively generating a hard stop of the master control arm regardless of the strength of the user or any existing momentum. Thus, force reflection can provide a safety feature of the robotic system.

Also shown in FIG. 17 is a virtual headset 522 that can be electrically or communicatively coupled to an external computer system. The headset 522 can be configured to display real-time video and other information as transmitted from cameras and other sensors on the slave robotic system 502, for instance. Alternatively or concurrently, the headset 522 can display a virtual three-dimensional environment including a rendering of a particular slave robotic system.

Figure 18:
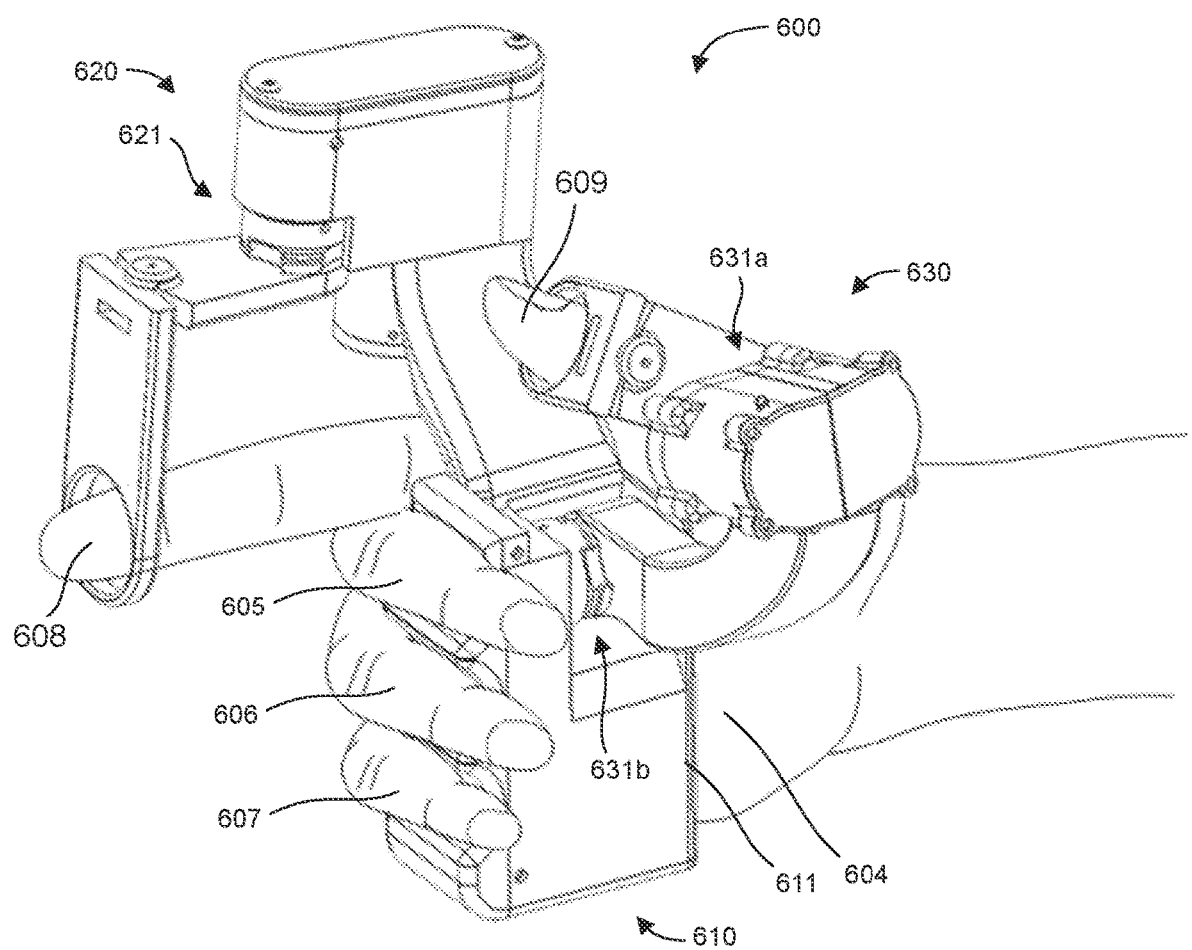
FIG. 18 is a perspective view of a hand control device for controlling a peripheral system engaged with a hand of a user, in accordance with an example.

FIG. 18 depicts a perspective view of a hand control device 600 for controlling a peripheral system in an example, as described in greater detail in U.S. patent application Ser. No. 13/665,697, filed Oct. 31, 2012, which is hereby incorporated herein by reference. A "peripheral system" or device can include any system or device, component thereof, or aspect thereof, controllable by the hand control device. Peripheral systems or devices can include, but are not limited to, electronic systems or devices, robotic systems or devices, objects or aspects within a virtual environment, etc. The hand control device 600 can function as a controller for a robotic system or device, as a controller for a virtual world interface, such as for a video game, or coordinated multi-degree-of-freedom control within a synthetic environment.

The hand control device 600 can include a handle 610 configured to be grasped by a user. The handle 610 can comprise a body portion 611 to be supported against a palm 604 of a user. In one aspect, the handle 110 can be configured to be supported against the palm 604 of the user by at least one finger of the user, such as by a middle finger 605, a ring finger 606, and/or a little finger 607. The handle 610 can form the basis for the physical interface with the user. As illustrated, the handle 610 can comprise a pistol grip configuration, although any other suitable configuration may be used. Utilizing the handle 610 as a basis of support for the finger control 620 and the thumb control 630 can provide a compact form factor for the hand control device 600.

The hand control device 600 can further comprise and can further include a finger control 620 supported about the handle 610. The finger control 620 can comprise a rotatable joint 621 to facilitate control based on intuitive and normal human flexion/extension of an index finger 608 of the user. In addition, the hand control device 600 can further comprise and can further include a thumb control 630 supported about the handle 610. The thumb control 630 can comprise first and second rotatable joints 631a, 631b to facilitate control based on normal and human flexion/extension and abduction/adduction of a thumb 609 of the user. Essentially, the hand control device 600 provides an operator to control a peripheral system or device by moving his/her finger(s) and thumb in a familiar, intuitive manner, which movements translate into manipulation of the finger and thumb controls 620 and 630, respectively, each of which are strategically located about the hand of the user to receive the finger and thumb, and each of which are configured to move in a coordinated, harmonized manner. The rotatable joints 621, 631a and 631b, can be or can comprise stiffening elements, with bladders and filler therein, as described above.

Figure 19:
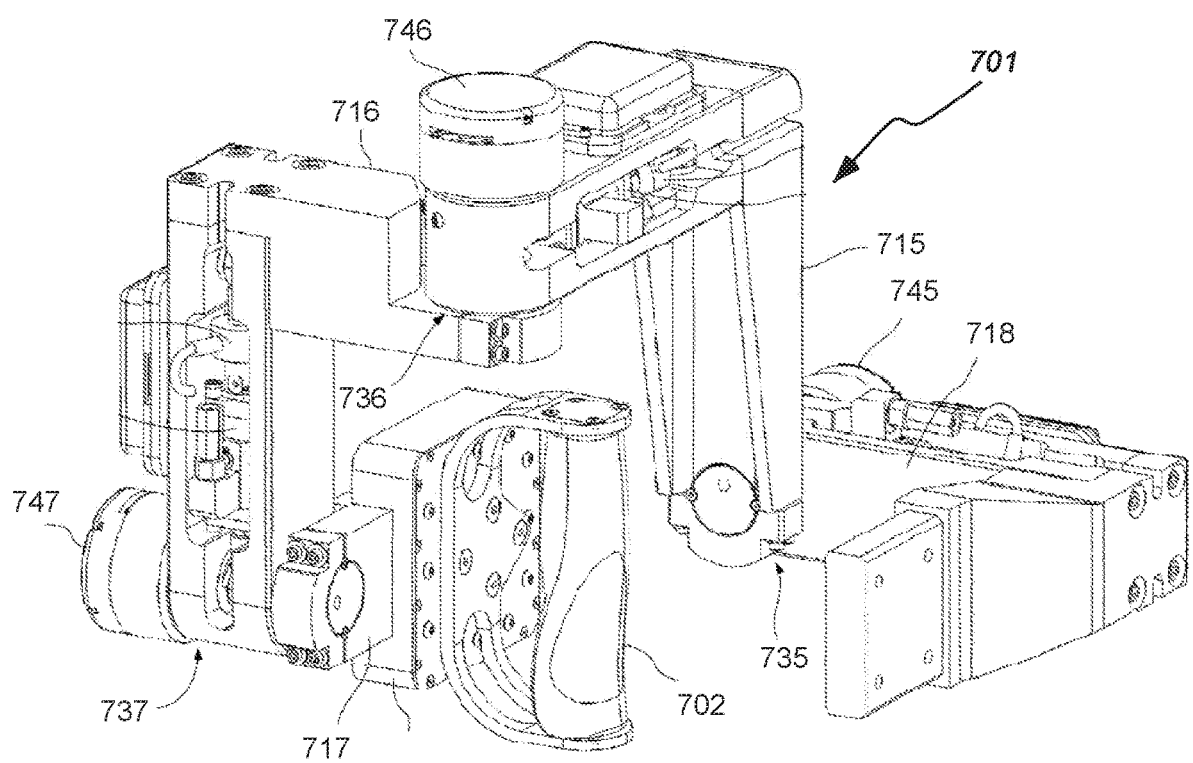
FIG. 19 is a perspective view of a wrist unit of the master control arm, in accordance with an example.

FIG. 19 depicts a perspective view of wrist unit of a master control arm for a teleoperated robotic system in an example, and as described in greater detail in PCT Application Serial No. PCT/US12/35620, filed Apr. 27, 2010, which is hereby incorporated herein by reference. The teleoperated robotic system (e.g., a lift system) can include master control arms, slave arms, and a platform. In operation, a user manipulates the master control arms to control movement of the slave arms. The user and master control arms can be remotely located relative to the slave arms. The master control arm can be configured to be manipulated by the user to control the movement of a slave arm, wherein movement by the user results in a corresponding movement by the slave arm. For example, the user can grasp a handle located at a distal end of the master control arm to manipulate the master control arm. In general, the master control arm can include joints and linkages that correspond to the user's arm, such that movement of the user's arm causes the master control arm to move in a manner similar to the user's movement. The slave arm can include joints and linkages that correspond to the master control arm, and thus, the user's arm as well. The movement of the master control arm can then cause the slave arm to move in a manner similar to the movement of the master control arm, thus allowing the user to control movement of the slave arm.

The master control arm can be configured as a kinematic system to include DOF and linkages that correspond to the DOF and linkages of the human arm from the shoulder to the wrist. The master control arm can be kinematically equivalent to a user's arm from the shoulder to the wrist. A human arm includes seven degrees of freedom from the shoulder to the wrist. Specifically, a human shoulder includes three DOF: abduction/adduction, flexion/extension, and humeral rotation. A human elbow includes one DOF. A human wrist can be generalized to include three DOF: wrist rotation, abduction/adduction, and flexion/extension. The upper arm extends from the shoulder and is connected to the lower arm by the elbow. The wrist is at the opposite end of the lower arm. The human arm from the shoulder to the wrist can thus be generalized as a kinematic system that includes a first joint having three rotational DOF connected to a second joint having one DOF by a first linkage, which is connected to a third joint having three DOF by a second linkage. As used herein, the terms "kinematically equivalent" or "kinematic equivalence" refer to a relationship between two or more separate systems of rigid bodies, wherein the rigid bodies of each system are linked by rotational joints to provide rotational degrees of freedom (DOF). Kinematically equivalent systems have similar corresponding rotational DOF, which are joined by similar corresponding linkages that are proportional in length between the systems. It is noted that "equivalent" or "equivalence" does not refer to a kinematic identity between the systems. Indeed, "kinematically equivalent" or "kinematic equivalence" can include some degree of variation from true kinematic identity.

In operation, the system can include force reflection from the slave arm to the master control arm. With force reflection, the user is provided with an additional sensory input for operating the slave arms. Unlike positional control, where the slave arm will operate to carry out the positional command from the master control arm regardless of obstacles that may be in the path of the slave arm, force reflection provides a proportional force feedback to the user via the master control arm to indicate loads that the slave arm is experiencing. For example, if the slave arm encounters an obstacle while executing a positional command from the master control arm, a load sensor on the slave arm can provide load information that is communicated to the master control arm, and actuators operable with the master control arm can apply a proportional load to the user based on the load information, which proportional load may be varied or different depending upon the particular operating environment and what may be desired to be applied to the user. With this force feedback, the user can more intuitively control the slave arm in the operating environment because it more closely resembles the user's experience operating the user's own body in everyday life.

In one aspect, the system can be configured to apply a force or load to the user that is proportional to the weight of an object being picked up by the slave arm. For example, if an object weighs 500 pounds, the proportional force reflected load experienced by the user could be 10 pounds. In another aspect, force reflection functions can be implemented that apply a force or load to the user when the slave arm encounters an object, wherein the user feels the resistance of the object via the master control arm and can take action to avoid or minimize harmful effects. Thus, force reflection can be a safety feature of the robotic system.

In certain aspects, force reflection implementation can include an increased load produced by the master control arm on the user when the slave arm experiences an impact event. In other words, an impact sensed by the load sensors can be reflected to the user via the master control arm as a transient spike in load disproportionate to the normal proportional setting for force reflection. For example, when the slave arm collides with a wall, the load sensors of the slave arm sense the impact. To alert the user that an impact has occurred, the master control arm can produce a load on the user that is disproportionately large relative to the current proportional force reflective setting for a brief period of time that can effectively represent the impact to the user. For example, the force on the user produced on an impact could be so disproportionately large that the user would not be able to further move the master arm, effectively generating a hard stop of the master control arm regardless of the strength of the user or any existing momentum.

The master control arm can include structure that positions the wrist DOF of the user in sufficient alignment with the corresponding DOF of the master control arm about the axes, such that kinematic equivalency can result. The wrist positioning structure, or wrist unit 701, is configured to support the handle 702 such that when the user is grasping the handle to manipulate the master control arm, the user's wrist is appropriately positioned relative to the DOF of the master control arm corresponding to the DOF of the user's wrist.

The wrist positioning structure can include various members 715, 716, 717 and 718 intercoupled by joints 735, 736 and 737. The joints can comprise stiffening elements 745, 746 and 747, with bladders with filler therein, as described above. The structure of the wrist unit 701 can provide a master control having three orthogonal axes corresponding to the three human wrist DOF that substantially align with the actual wrist DOF of the system operator. Additionally, the wrist unit 701 structure can accommodate a position sensor, a load sensor, and/or an actuator for each DOF of the wrist unit. Thus, the wrist unit 701 can be suitable for position control of a slave arm, load control of a slave arm, force reflection feedback from a slave arm, gravity compensation of the wrist unit, torque assistance of the wrist unit, and combinations thereof.

Figure 20:
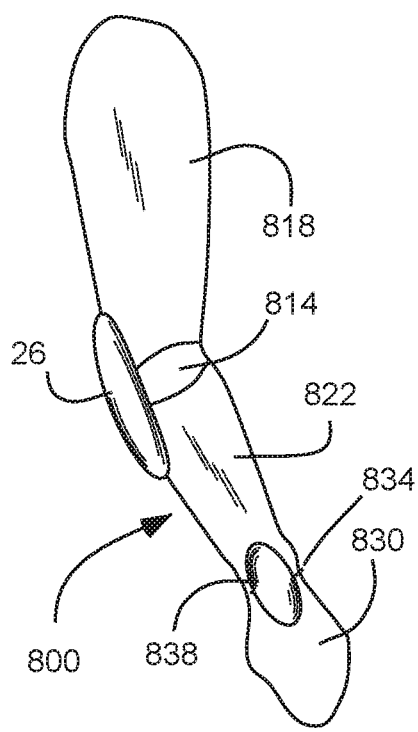
FIG. 20 is a schematic side view of another stiffening element in accordance with another example, and being configured as an arm sleeve.

FIG. 20 depicts a schematic side view of a stiffening element 800 in accordance with another example. The stiffening element 800 is similar in many respects to those described above, and which descriptions are hereby incorporated herein where applicable, as will be recognized by those skilled in the art. The pair of members 818 and 822 comprise a pair of sleeves movably coupled together at and that define a flexible joint 814. In one aspect, the sleeves 818 and 822 can be flexible and resilient, or elastic. The pair of sleeves 818 and 822 can be donned and doffed (i.e., worn) by a user on the user's arm. Thus, one sleeve 818 can be sized and shaped for the user's arm or upper arm, while another sleeve 822 can be sized and shaped for a user's forearm or lower arm, and the joint 814 can be sized and shaped for the user's elbow. The bladder 26 can be coupled to the pair of sleeves 818 and 822 at the elbow or joint 814. For example, the bladder can be internal to the sleeves. In one aspect, the joint 814 can be formed as a sleeve or band, and the band can circumscribe the joint and carry the bladder 26. In addition, the pair of sleeves can further comprise a glove or mitt 830 coupled to the lower arm sleeve 822 at a wrist joint 834 with a bladder 838 coupled to the lower arm sleeve 822 and the glove or mitt 830. The bladders 26 and 838 can comprise filler, and can be operable with a pressure source to control the stiffening of the joint, as described herein.

Figure 21:
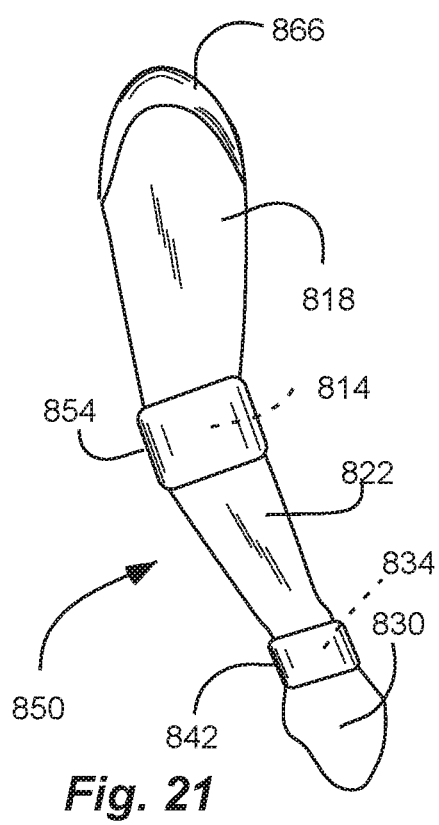
FIG. 21 is a schematic side view of another stiffening element in accordance with another example.

FIG. 21 depicts a schematic side view of a stiffening element 850 in accordance with another example. The stiffening element 850 is similar in many respects to those described above, and which descriptions are hereby incorporated herein where applicable, as will be recognized by those skilled in the art. The bladder 854 can surround or circumscribe the joint 814. Thus, the bladder 854 can operate to resist motion about multiple axes simultaneously. In one aspect, the entire bladder 854 can circumscribe the joint 814. Thus, the bladder 854 can have a torus shape. In addition, a bladder 842 can surround or circumscribe the wrist joint 834, and can be coupled to the lower arm sleeve 822 and the glove or mitt 830. Furthermore, a shoulder bladder 866 can be coupled around a shoulder joint, and coupled to the arm sleeve 818. Again, bladders 854, 842 and 866 can comprise filler, and can be operable with a pressure source to control the stiffening of the joint, as described herein.

Figure 22:
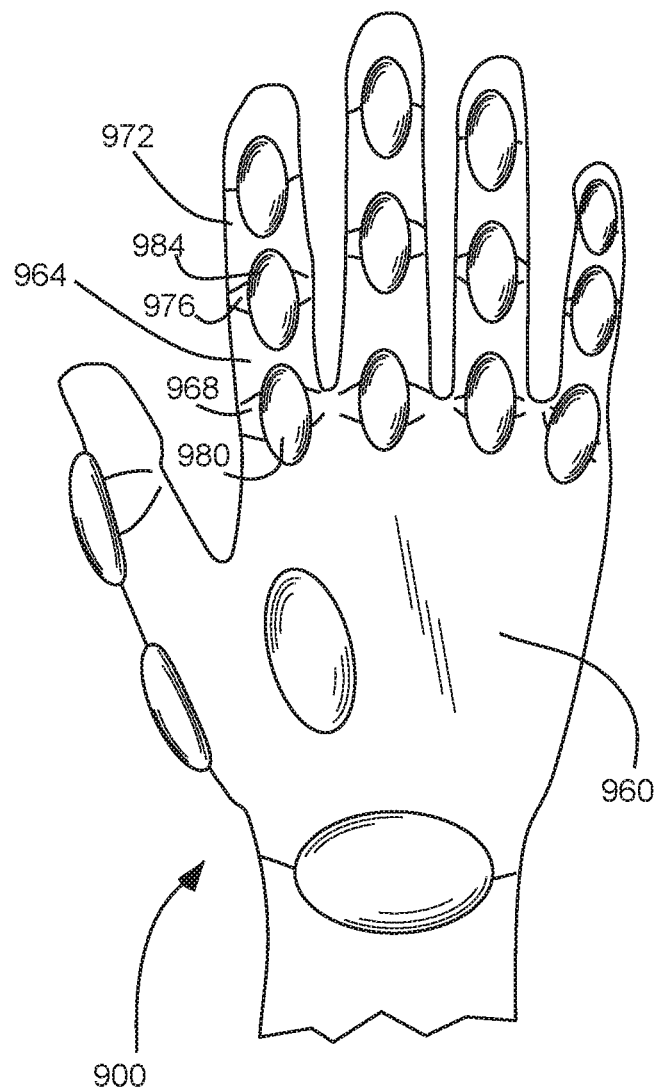
FIG. 22 is a schematic rear view of another stiffening element in accordance with another example, and being configured as a glove.

FIG. 22 depicts a schematic rear view of a glove 900 in accordance with another example, with multiple stiffening elements 910 that are similar in many respects to those described above, and which descriptions are hereby incorporated herein where applicable, as will be recognized by those skilled in the art. The glove 900 can be donned and doffed (i.e., worn) by a user. The glove 900 comprises multiple movable members, with some members arranged in series, and other members arranged in parallel, and multiple joints 914 coupling adjacent movable members. The members can comprise a palm portion 960 corresponding to a palm; a series of proximal portions 964 pivotally coupled to the palm portion by metacarpophalangeal joints 968; a series of medial portions 972 pivotally coupled to the series of proximal portions 968, respectively, by interphalangeal joints 976. The bladder can comprise a plurality of bladders intercoupled between the members. The plurality of bladders can comprise a series of metacarpophalangeal bladders 980 coupled to the palm 960 and the series of proximal portions 968, respectively; and a series of interphalangeal bladders 984 coupled to the series of proximal and medial portions 968 and 976, respectively. Each of the bladders can comprise filler, and can be operable with a pressure source to control the stiffening of the joint, as described herein. Only some of the joints can be equipped with a bladder depending upon the intended use.

Figure 23:
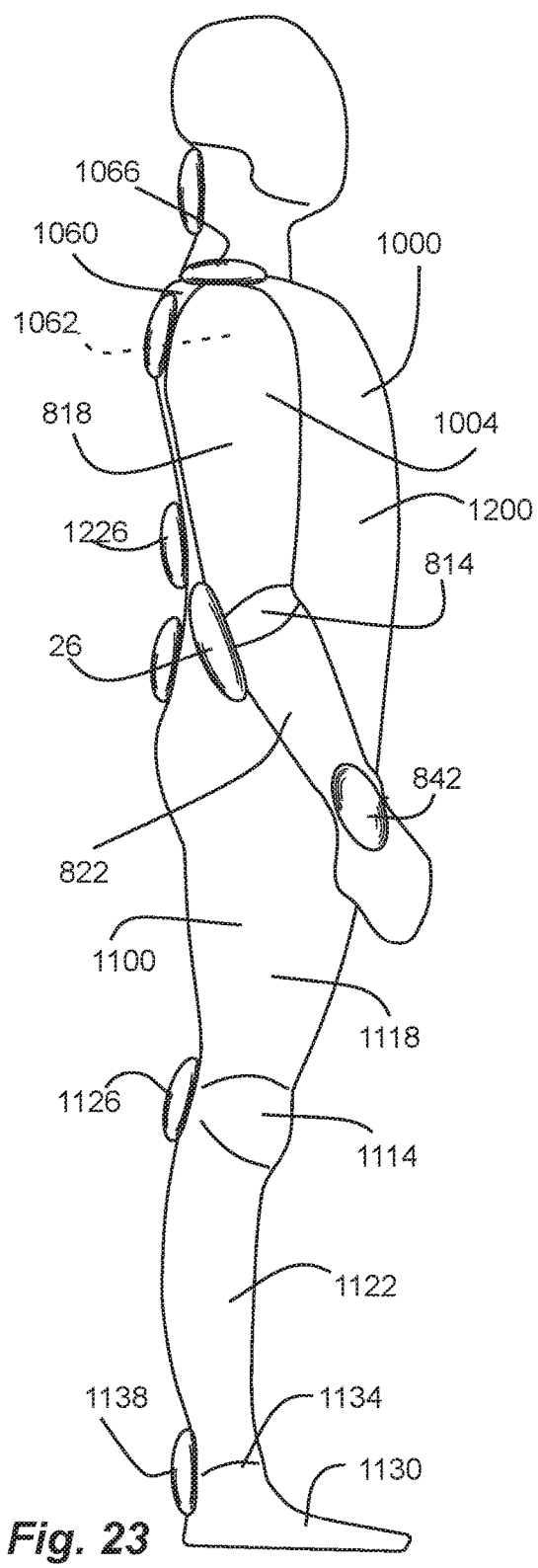
FIG. 23 is a schematic side view of a body suit with stiffening elements in accordance with another example.
Figure 24:
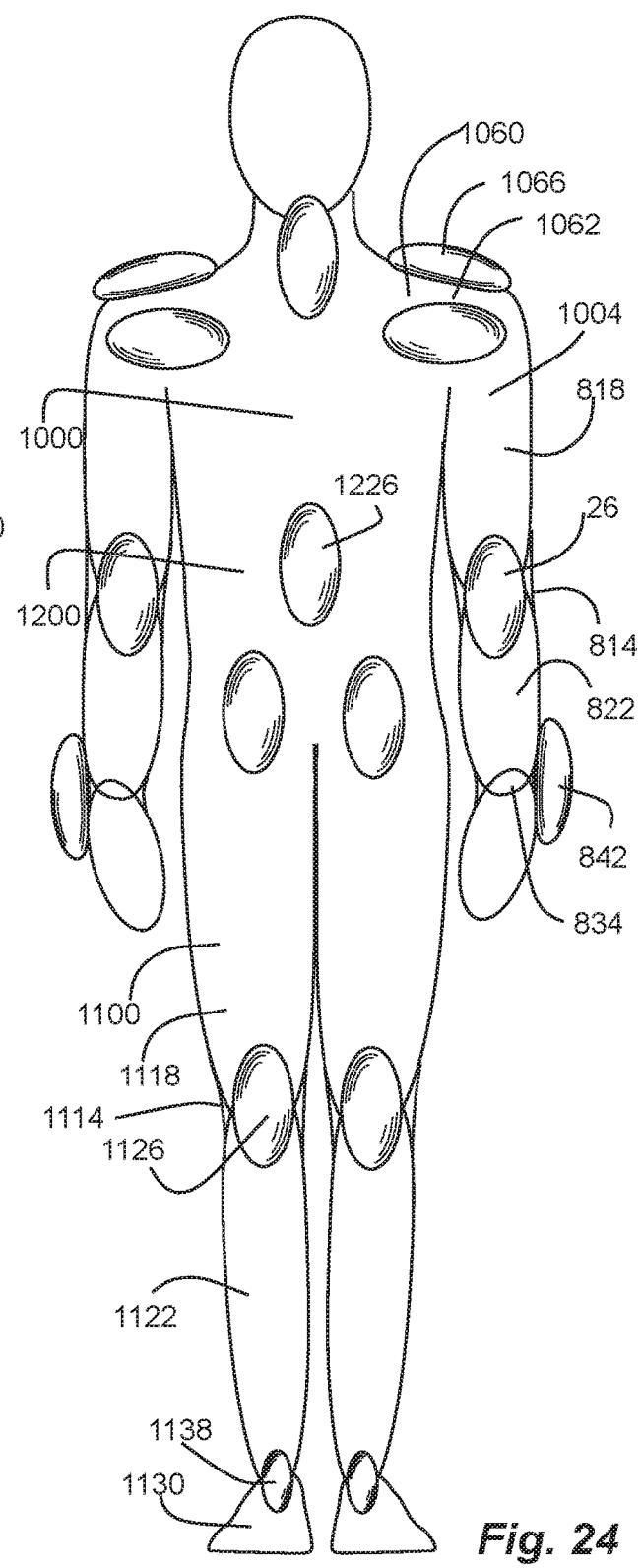
FIG. 24 is a schematic rear view of the body suit of FIG. 23.

FIGS. 23 and 24 depict schematic side and rear views, respectively, of a body suit 1000 including an arm sleeve 1004 in accordance with another example, with multiple stiffening elements 1010 that are similar in many respects to those described above, and which descriptions are hereby incorporated herein where applicable, as will be recognized by those skilled in the art. The body suit 1000, including an arm sleeve 1004, can be donned and doffed, or in other words worn, by a user. The body suit 1000 can comprise multiple movable members, with some members arranged in series, and other members arranged in parallel, and multiple joints 1014 coupling adjacent movably members. With respect to the arm sleeve 1004, the members can comprise a shoulder portion 1060 corresponding to a shoulder; an arm portion 818 pivotally coupled to the shoulder portion 1060 by shoulder joint 1062; a forearm portion 822 pivotally coupled to the arm portion 828 by an elbow joint 814. A plurality of bladders can comprise one or more shoulder bladders 1066 coupled to the shoulder and the arm portions 1060 and 818; and an elbow bladder 26 coupled to the arm and the forearm portions 818 and 822.

In addition, a leg sleeve 1100 can have a thigh sleeve 1118 and a lower leg sleeve 1122 coupled at a knee joint 1114. A knee bladder 1126 can be disposed at the knee joint 1114 and coupled to the thigh and lower leg sleeves 1118 and 1122. In addition, a boot or sock 1130 can be coupled to the lower leg sleeve 1122 at an ankle joint 1134 with a bladder 1138 coupled to the lower leg sleeve 1122 and the boot or sock 1130. Furthermore, a torso sleeve 1200 with upper and lower portions can be disposed around a user's torso, and can have torso bladders 1226 coupled thereto. Each of the bladders can comprise filler, and can be operable with a pressure source to control the stiffening of the joint, as described herein.

The stiffening element(s) and the force reflective interface system(s) described above are capable of being used to provide a reflected force and/or a haptic response to a virtual environment. Thus, the stiffening element(s) and the force reflective interface system(s) described above can be used with a virtual display displaying a virtual reality, such as the virtual headset 522, as shown in FIG. 17.

In another aspect, the controller 42 can be capable of modulating the pressure source 38 to modulate the pressure within the bladder 26 at a frequency greater than 0.1 Hz in one aspect, between 0.1 to 60 Hz in another aspect, and between 0.1 to 500 Hz in another apsect. Modulating the pressure at high frequency can be utilized to mimic surface roughness or texture, such that the master control system, the operator or both can feel and discern surface roughness or texture.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A stiffening element device configured to provide variable resistance, the device comprising:
 a joint with a pair of movable members being movable with respect to one another about the joint;
 a bladder coupled to the pair of movable members; and
 a filler within and flowable in the bladder and comprising particles, wherein a flow characteristic of the filler varies with pressure within the bladder, and resistance to movement of the pair of movable members varies with the flow characteristics of the filler,
 wherein the bladder with the filler therein is part of a force reflective interface of a force feedback system.

2. The device of claim 1, wherein a volume of the bladder varies as a function of pressure within the bladder.

3. The device of claim 1, further comprising a pressure source operatively coupled to the bladder and capable of varying the pressure within the bladder.

4. The device of claim 3, wherein the pressure source comprises a vacuum source for selectively withdrawing fluid from the bladder.

5. The device of claim 3, further comprising a position sensor operatively coupled to at least one of the pair of members capable of providing feedback pertaining to the location of the pair of members.

6. The device of claim 3, further comprising a controller operatively coupled to the pressure source to control the pressure source to selectively vary the pressure within the bladder; and wherein the controller modulates the pressure source to modulate the pressure within the bladder at a frequency greater than 0.1 Hz.

7. The device of claim 3, wherein the pressure source is operable to provide a variable range of pressures within the bladder to provide a variable degree of resistance to movement of the pair of movable members within the joint.

8. The device of claim 3, wherein the pressure source is capable of varying pressure within the bladder to provide resistance to movement of the pair of movable members between, and including, a zero resistance within the joint and a locked joint.

9. The device of claim 1, wherein the bladder is flexible and has a volume that is changeable.

10. The device of claim 1, wherein the bladder is disposed at the joint, and spans across at least a portion of the joint.

11. The device of claim 1, wherein the bladder changes shape and position as one member moves with respect to the other; and wherein the filler flows, and the particles move with respect to one another, within the bladder as the bladder changes shape and position.

12. The device of claim 1, wherein the bladder circumscribes the joint.

13. The device of claim 1, wherein the bladder comprises multiple bladders, each coupled to the pair of members, and each containing filler.

14. The device of claim 13, wherein the bladders are in parallel with respect to one another.

15. The device of claim 13, wherein the bladders are in series with respect to one another.

16. The device of claim 1, wherein the bladder comprises multiple chambers therein defining collapsible pockets.

17. The device of claim 16, wherein some of the chambers contain the filler, and wherein some of the chambers are devoid of the filler.

18. The device of claim 1, wherein the bladder comprises multiple bladders, each coupled to the pair of members, and wherein each of the multiple bladders comprises a different filler.

19. The device of claim 1, wherein the bladder comprises an inner bladder with the filler material therein, and an outer bladder over the inner bladder; and further comprising a positive pressure source for selectively increasing the pressure within the outer bladder to collapse the inner bladder about the particles to compress the particles.

20. The device of claim 1, wherein the filler further comprises an interstitial material disposed in interstices between the particles.

21. The device of claim 1, wherein the filler further comprises a fluid disposed in interstices between the particles.

22. The device of claim 1, further comprising a pressure sensor operatively coupled to the bladder capable of providing feedback pertaining to pressure within the bladder.

23. The device of claim 1, wherein the joint and the pair of members comprise a wearable article capable of being worn by a user.

24. The device of claim 1, wherein the pair of members comprise a pair of sleeves movably coupled together; and wherein the bladder is coupled to the pair of sleeves.

25. The device of claim 1, further comprising:
a glove capable of being worn by a user and comprising multiple movable members in series and in parallel and multiple joints coupling adjacent movable members, comprising:
   a palm portion corresponding to a palm;
   a series of proximal portions pivotally coupled to the palm portion by metacarpophalangeal joints;
   a series of medial portions pivotally coupled to the series of proximal portions, respectively, by interphalangeal joints; and
the bladder comprising:
   at least one metacarpophalangeal bladder coupled to the palm and at least one of the series of proximal portions; or
   at least one interphalangeal bladder coupled to at least one of the series of proximal and medial portions.

26. The device of claim 1, further comprising:
an arm sleeve capable of being worn by a user and comprising multiple movable members in series and multiple joints coupling adjacent movable members, comprising:
   a shoulder portion corresponding to a shoulder;
   an arm portion pivotally coupled to the shoulder portion by shoulder joint;
   a forearm portion pivotally coupled to the arm portion by an elbow joint; and
the bladder comprising a plurality of bladders comprising:
   a shoulder bladder coupled to the shoulder and the arm portions; and
   an elbow bladder coupled to the arm and the forearm portions.

27. The device of claim 1, further comprising a band circumscribing the joint and carrying the bladder.

28. The device of claim 1, wherein the joint has multiple degrees of freedom; and wherein the bladder comprises multiple bladders, each corresponding to a degree of freedom of the joint.

29. The device of claim 1, wherein the joint has multiple degrees of freedom; and wherein the bladder is sized and position to correspond to the multiple degrees of freedom of the joint.

30. The device of claim 1, wherein the particles of the filler are elastically compressible.

31. The device of claim 1, wherein the particles of the filler have an elastic modulus between 0.01-3.5 GPa.

32. The device of claim 1, wherein the particles of the filler have an elastic modulus between 50-100 GPa.

33. The device of claim 1, wherein the particles of the filler have at least two different elastic moduli.

34. The device of claim 1, wherein the particles of the filler further comprises at least two different sizes of particles.

35. The device of claim 1, wherein the particles of the filler are substantially spherical.

36. The device of claim 1, wherein the particles of the filler comprise at least two different shapes of particles.

37. A force reflective interface apparatus operable with a slave robotic device within a real environment, comprising the stiffening element device of claim 1, wherein the force reflective interface apparatus is operable to translate a force at the slave robotic system to the stiffening element device, wherein the stiffening element device is operable to generate a braking force within the joint corresponding to the force at the slave robotic system.

38. The force reflective interface apparatus of claim 37, further comprising a pressure source operatively coupled to the bladder and capable of varying the pressure within the bladder.

39. A force reflective interface apparatus operable with a virtual environment, comprising the stiffening element device of claim 1, wherein the force reflective interface apparatus is operable to translate a force associated with the virtual environment to the stiffening element device, wherein the stiffening element device is operable to generate a braking force within the joint corresponding to the force associated with the virtual environment.

40. The force reflective interface apparatus of claim 39, further comprising a pressure source operatively coupled to the bladder and capable of varying the pressure within the bladder.

41. The device of claim 1 wherein the force feedback system comprises a master robotic system and a slave robotic system.

42. The device of claim 41 wherein the slave robotic system comprises a slave joint and the master robotic system comprises a master brake joint corresponding to the slave joint, and wherein the bladder with the filler therein is operable to generate a resistive force to the master brake joint.

43. The device of claim 42, wherein the resistive force comprises a variable force reflection of the slave joint.

44. The device of claim 43, wherein the variable force reflection of the slave joint is set to a predetermined proportion of a force experienced within the slave joint.

45. A force reflective interface apparatus, the apparatus comprising:
a wearable article capable of being worn by a user and comprising a pair of movable members being movable with respect to one another about a joint; and
a stiffening element device configured to provide variable resistance, the device comprising:
   a bladder coupled to the pair of movable members; and
   a filler flowable in the bladder and comprising particles, wherein a flow characteristic of the filler varies with pressure within the bladder, and resistance to movement of the pair of movable members varies with the flow characteristics of the filler.

46. The force reflective interface apparatus of claim 45, further comprising a pressure source operatively coupled to the bladder and capable of varying a pressure within the bladder.

47. A force feedback system comprising:
- a slave robotic system comprising a plurality of slave joints;
- a master robotic system comprising a master brake joint corresponding to each of the plurality of slave joints, each of the master brake joints comprising:
  - a pair of movable members being movable with respect to one another about the master brake joint;
  - a bladder coupled to the pair of movable members; and
  - a filler within and flowable in the bladder and comprising particles, wherein a flow characteristic of the filler varies with pressure within the bladder, and resistance to movement of the pair of movable members varies with the flow characteristics of the filler, the resistance to movement of the pair of movable members corresponding to forces experienced within the corresponding slave joint.

* * * * *